(12) United States Patent
Malpass

(10) Patent No.: US 7,200,743 B1
(45) Date of Patent: Apr. 3, 2007

(54) SIMULTANEOUS INITIALIZATION OF A PLURALITY OF MEMORY ELEMENTS FROM AMONG A PLURALITY OF INITIALIZATION VALUES

(75) Inventor: Welborn Malpass, Evergreen, CO (US)

(73) Assignee: Mindspeed Technologies, Inc., Newport Beach, CA (US)

( * ) Notice: Subject to any disclaimer, the term of this patent is extended or adjusted under 35 U.S.C. 154(b) by 675 days.

(21) Appl. No.: 10/261,013

(22) Filed: Sep. 30, 2002

(51) Int. Cl.
*G06F 15/177* (2006.01)

(52) U.S. Cl. ........................................ 713/1
(58) Field of Classification Search ............... 713/1, 713/2
See application file for complete search history.

(56) References Cited

U.S. PATENT DOCUMENTS

| | | | |
|---|---|---|---|
| 4,646,269 A | 2/1987 | Wong et al. | |
| 4,684,826 A | 8/1987 | France et al. | |
| 4,694,431 A | 9/1987 | Miyamura et al. | |
| 5,175,831 A | 12/1992 | Kumar | |
| 5,212,795 A | 5/1993 | Hendry | |
| 5,230,058 A | 7/1993 | Kumar et al. | |
| 5,596,761 A | 1/1997 | Yoshioka et al. | |
| 6,128,733 A * | 10/2000 | Miyaguchi et al. | 713/2 |
| 6,192,447 B1 | 2/2001 | Shand | |
| 6,496,911 B1 * | 12/2002 | Dixon et al. | 711/170 |
| 6,857,065 B2 * | 2/2005 | Blaner et al. | 713/1 |
| 6,880,075 B1 * | 4/2005 | Fukano et al. | 713/1 |
| 6,904,504 B2 * | 6/2005 | Kahn et al. | 711/163 |
| 6,981,135 B1 * | 12/2005 | Trask | 713/2 |

\* cited by examiner

*Primary Examiner*—Rehana Perveen
*Assistant Examiner*—Eric Chang
(74) *Attorney, Agent, or Firm*—Keith Kind; Kelly H. Hale

(57) ABSTRACT

An electronic device according to one embodiment of the invention includes at least a first memory element and a second memory element, a first plurality of initialization value sets, and a second plurality of initialization value sets. The device further includes first and second initialization logic circuits that receives a mode value and a reload signal. Upon occurrence of the reload signal, the first initialization logic circuit selects a first predetermined initialization value set from among the first plurality of initialization value sets according to the mode value and initializes the first memory element with the first predetermined initialization value set. Substantially simultaneously, the second initialization logic circuit likewise selects a second predetermined initialization value set according to the mode value and initializes the second memory element.

17 Claims, 8 Drawing Sheets

SIMULTANEOUS INITIALIZATION OF A PLURALITY OF MEMORY ELEMENTS FROM AMONG A PLURALITY OF INITIALIZATION VALUES

BACKGROUND OF THE INVENTION

1. Field of the Invention

The invention is related to the field of memory devices, and in particular, to initialization of memory devices.

2. Description of the Prior Art

Electronic devices commonly employ some manner of memory. The memory may be used to store a control routine, store values to be used during operation, and/or store values to be used during initialization.

The memory may include solid state memory, i.e., memory formed of transistor devices. The memory may comprise a number of registers. Registers comprise a number of memory cells, and are commonly used by an associated processing system to hold values generated by a software routine executing on the processing system. In many electronic devices, a number of registers are initialized at power-up of the device, or upon a reset of the device. The initialization may include loading of any manner of common or desired data values into the registers. The initialization enables the electronic device to consistently operate in a known manner.

FIG. 1 shows an electronic device constructed according to a prior art initialization approach. In the prior art, the initialization values are stored in a non-volatile memory, such as a read-only memory (ROM), for example. The initialization values, such as the bytes AAh (hexadecimal) and 00h in the example shown, are read out of the non-volatile memory in a conventional manner. The initialization values are transmitted serially to the memory and programmed into corresponding registers.

The prior art approach has several drawbacks. The serial reading out and programming of the initialization values takes significant time to perform. The required time grows with the number of registers to be initialized. The prior art approach was relatively workable when the number of registers to be programmed was small. As electronic devices have become more sophisticated, they have included larger and larger register sets, and as a result the initialization time has become longer and longer. In addition, for purposes of manufacturing economy and product flexibility, many electronic devices are now capable of operating in a plurality of modes, and each mode may require a different set of initialization values. Therefore, in order to configure the electronic device in different modes, the initialization values in the non-volatile memory must be re-programmed, incurring extra time and cost. These factors have made memory initialization problematic.

SUMMARY OF THE INVENTION

The invention helps solve the above problems by providing an improved memory element initialization capability. An electronic device according to one embodiment of the invention comprises a memory that includes at least a first memory element and a second memory element, a first plurality of initialization value sets available to be loaded into the first memory element, and a second plurality of initialization value sets available to be loaded into the second memory element. The electronic device further comprises a mode value that indicates a mode from among a plurality of modes of the electronic device. The electronic device further comprises a first initialization logic circuit and a second initialization logic circuit corresponding to the first memory element and the second memory element. The first and second initialization logic circuits receive the mode value and are adapted to receive a reload signal. Upon occurrence of the reload signal, the first initialization logic circuit selects a first predetermined initialization value set from among the first plurality of initialization value sets according to the mode value and initializes the first memory element with the first predetermined initialization value set. Substantially simultaneously, the second initialization logic circuit selects a second predetermined initialization value set from among the second plurality of initialization value sets according to the mode value and initializes the second memory element with the second predetermined initialization value set.

BRIEF DESCRIPTION OF THE DRAWINGS

The same reference number represents a common element in the drawings.

DETAILED DESCRIPTION OF THE PREFERRED EMBODIMENT

FIGS. 2–8 and the following description depict specific embodiments to teach those skilled in the art how to make and use the best mode of the invention. For the purpose of teaching inventive principles, some conventional aspects have been simplified or omitted. Those skilled in the art will appreciate variations from these examples that fall within the scope of the invention. Those skilled in the art will appreciate that the features described below can be combined in various ways to form multiple variations of the invention. As a result, the invention is not limited to the specific embodiments described below, but only by the claims and their equivalents.

Figure 1:
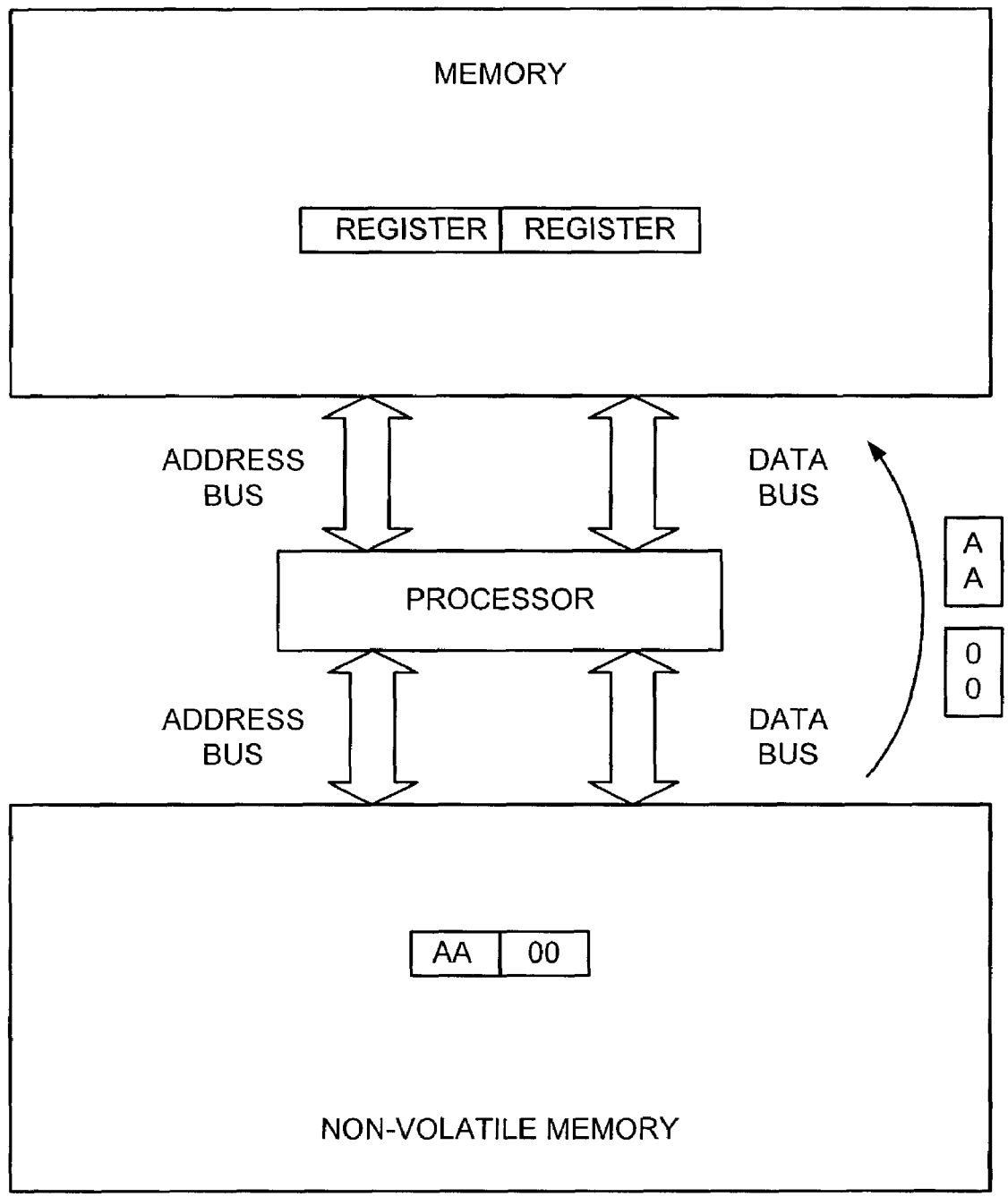
FIG. 1 shows an electronic device constructed according to a prior art initialization approach.
Figure 2:
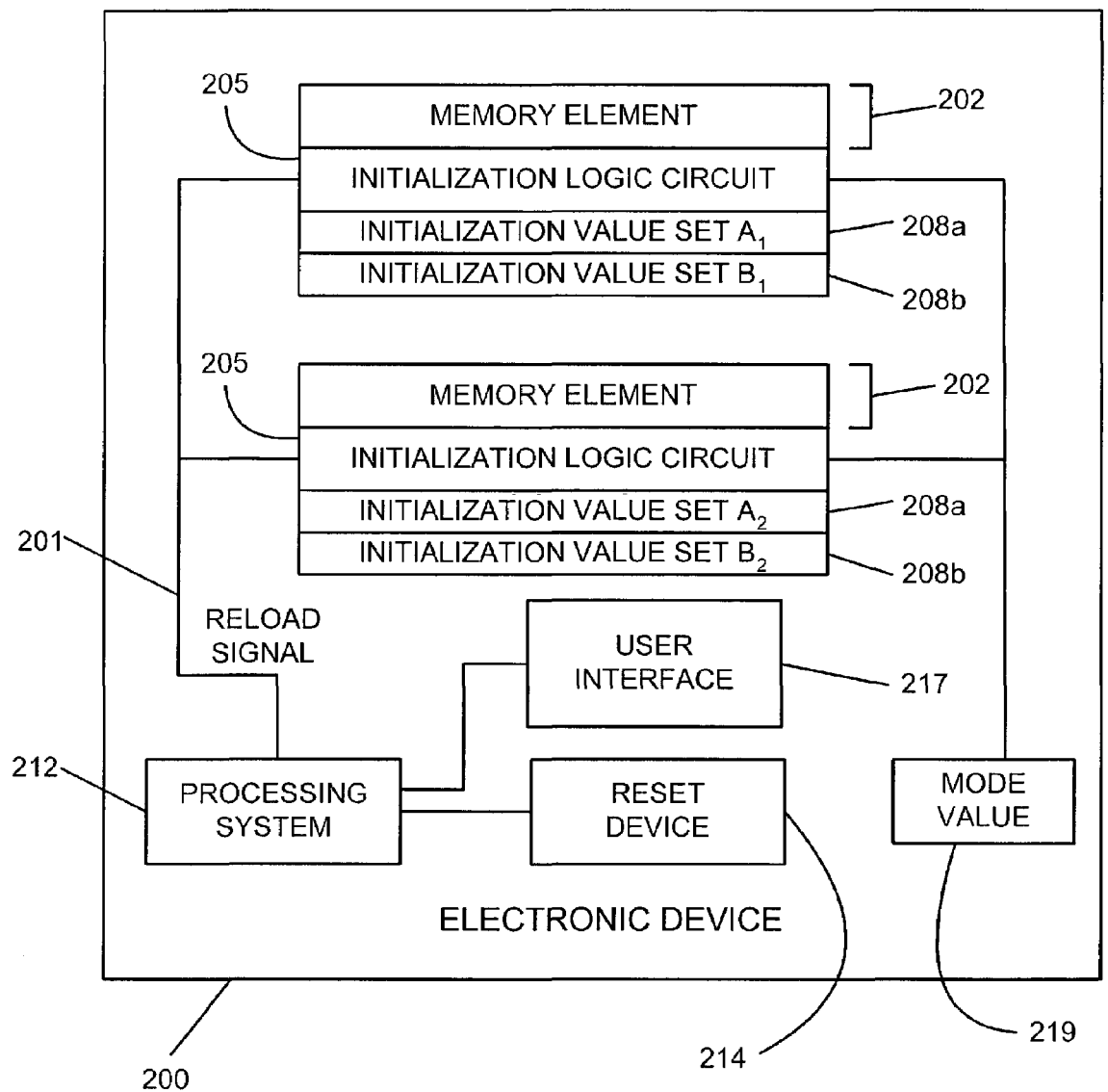
FIG. 2 is block diagram of an electronic device according to one embodiment of the invention.

FIG. 2 is block diagram of an electronic device 200 according to one embodiment of the invention. The electronic device 200 includes a plurality of memory elements 202, a corresponding plurality of initialization logic circuits 205, a plurality of initialization value sets 208a, 208b, etc., for each memory element 202, a reload signal line 201, and a mode value 219. It should be understood that the electronic device 200 may include memory elements that do not have associated corresponding initialization logic circuits, thus such memory elements may not be initialized according to the invention. The electronic device 200 may further include a processing system 212, a user interface 217, and a reset device 214.

Each initialization logic circuit 205 is connected to a corresponding memory element 202 and to a corresponding plurality of initialization value sets 208a, 208b, etc. of the particular memory element 202. In addition, each initialization logic circuit 205 is connected to the mode value 219 and to the reload signal line 201. The reload signal line 201 may be connected to the processing system 212, and the processing system 212 may be connected to the user interface 217 and the reset device 214.

Each memory element 202 comprises a digital memory element. Each memory element 202 may comprise a single memory storage cell or a plurality of memory storage cells. For example, in one embodiment a memory element 202 stores a digital bit. In an alternate embodiment, a memory element 202 stores a plurality of digital bits, such as a nibble, a byte, a word, a double word, etc. In yet another embodiment, a memory element 202 comprises a register. In addition, other types of data sets may be stored.

The reload signal line 201 transmits a reload signal to the initialization logic circuits 205. A reload signal may appear as a result of a reset occurrence in the electronic device 200. A reset may occur as a result of a power-up or may occur as a result of a loss of power. Alternatively, a reset may occur as a consequence of a runtime execution error within the processing system 212, such as a stack overflow, for example (i.e., a "warm" reset). The reload signal may also appear as a result of an initialization, independent of a reset. Other resets may also be employed.

The processing system 212 may generate a reset or may pass on a reset signal generated by the reset device 214. Alternatively, the reload signal may comprise an initialization signal generated by the processing system 212. The processing system 212 may provide a software-generated initialization signal (i.e., generated by the processing system 212 in response to a software feature in a control routine), such as upon the occurrence of some manner of milestone. For example, the processing system 212 may receive a "change mode" command from an external device, and in response may change the mode value 219 and prompt a reload of all affected memory elements 202. In another scenario, the processing system 212 may receive a user input through the user interface 217 that prompts a reloading of memory elements 202 (the mode value 219 may likewise be changed). The user may select a menu item, enter a command, select a graphical icon, etc., in order to prompt the initialization process and therefore generate the reload signal. Other methods may additionally be used to prompt and/or control a reload operation.

A major mode change of the electronic device 200 may be accompanied by a reset. The reset is able to configure the electronic device 200 with regard to the memory elements or registers that can be accessed, and will load the appropriate initialization value sets into the memory elements 202. An initialization may be used when the user desires to reload the starting values without resetting the entire electronic device 200 (because a reset usually has a much broader effect than simply loading control registers).

The mode value 219 may be chosen to reflect a desired reset or initialization mode, and may be changeable during operation of the electronic device 200. If desired, the mode value 219 may be of any size. For example, the mode value 219 may be a 4-bit number that selects from among 16 mode sets, or may be a 2-bit number that selects from among 4 mode sets.

In one embodiment, the mode value 219 is hardwired. The mode value 219 therefore comprises one or more lines connected to a digital logic one (such as a positive voltage supply rail, for example) and/or to a digital logic zero (such as ground, for example).

In an alternative embodiment, the mode value 219 is a digital value stored in a mode value memory element, such as a non-volatile memory element. The mode value 219 in this embodiment may be user-settable, i.e., the processing system 212 may receive a "change mode value" command from the user interface 217. In this manner, the user may select a desired mode. Alternatively, the processing system 212 may be configured to modify the stored mode value 219. The modification may occur, for example, when a mode value is received from an external device or upon receipt of an appropriate user input. In this example, the electronic device 200 may be configured through use of an appropriate communication medium.

In yet another alternative embodiment, the mode value 219 comprises user-settable switches. Consequently, a user can change the mode of the electronic device 200 by setting the switches and cycling power or otherwise forcing a reload of the initialization value sets. Other mode values and reloading techniques may be employed.

Each initialization value set 208 may comprise multiple initialization value sets 208a, 208b, etc., that may be selected among by the mode value 219. An initialization value set may comprise one or more values, such as an initialization bit, byte, word, etc. For example, if the initialization value sets 208 contain up to four initialization values A, B, C, and D, then the mode value 219 may reflect four mode values, such as a two-bit number. In this example, the mode value 219 could be the decimal values 0, 1, 2, and 3, or may be the equivalent binary values 00, 01, 10, and 11.

An initialization logic circuit 205 may be any circuit, set of logic gates, etc., that operates according to the invention. Each initialization logic circuit 205 receives the reload signal and the mode value 219, selects from among the available initialization values when a reload signal is received, and initializes the corresponding memory element 205 with the selected initialization value set. One embodiment of the initialization logic circuit 205 is shown below in FIG. 4 and is discussed in the accompanying text.

The processing system 212 executes a control routine contained in a storage system. In addition, the processing system 212 receives inputs and conducts operations of the electronic device 200, including receiving user inputs from the user interface 217 and controlling the reload signal line 201. In addition, in some embodiments the processing system 212 may read the mode value 219 and may be capable of modifying the mode value 219.

The processing system 212 may be a general purpose processing system. The processing system 212 may comprise a programmed general purpose computer or a microprocessor. Alternatively, the processing system 212 may comprise a logic circuit or other programmable or special purpose circuitry and equipment.

The reset device 214 is a device capable of producing a reset signal upon a non-operational power level (such as a power-up or a loss of voltage). The reset signal may be provided to the processing system 212, or may be communicated to the reload signal line 201 in some manner. The reset device 214 in one embodiment comprises a reset chip device, as is known in the art. Alternatively, the reset device 214 may be a known reset circuit.

The user interface 217 accepts user inputs and may generate outputs and displays to the user. In one embodiment, the user interface 217 may comprise an input device, such as a keyboard, a mouse or other pointing device, a menu, a voice recognition interface, etc. In another embodiment, the user interface 217 may comprise an input/output device. In addition to the previously recited input devices, the input/output user interface 217 may including a display, a touchscreen, etc., and combinations of the various input and output devices.

Figure 3:
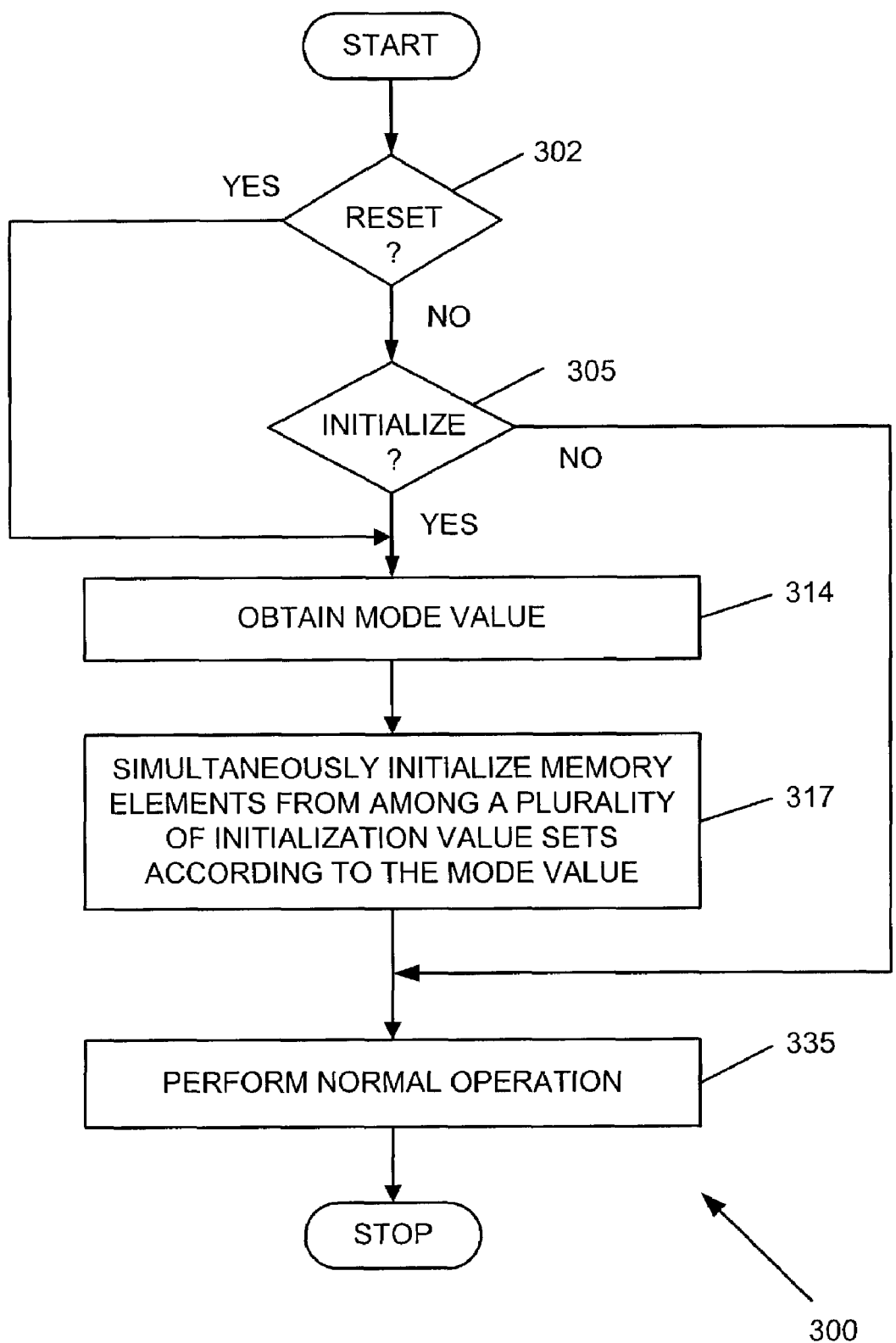
FIG. 3 is a flowchart of a memory element initialization method according to another embodiment of the invention.

In operation, when each initialization logic circuit 205 receives a reload signal on the reload signal line 201, the initialization logic circuit 205 obtains the mode value 219, selects an initialization value set 208x from among the plurality of initialization value sets 208a, 208b, etc., according to the mode value 219, and initializes a corresponding memory element 202 with the selected initialization value set 208x (also see FIG. 3 and the accompanying discussion). A plurality (or all) of the memory elements 202 are substantially simultaneously initialized. The initialization may occur upon a reset of the electronic device 200 or upon some other timetable or milestone, including appropriate user inputs.

The simultaneous initialization according to the invention can be much faster than the prior art serial initialization approach wherein initialization values are read out of memory, transported over a bus, and serially programmed into destination registers. According to the invention, an initialization process and initialization values may not need to be programmed into a control software. In addition, the electronic device 200 can be initialized in one of a plurality of modes, and each initialization value set can implement a unique mode in the electronic device 200. This eliminates the need for multiple register sets for multiple modes, and therefore reduces cost, ensures proper operation, and frees up memory space.

FIG. 3 is a flowchart 300 of a memory element initialization method according to another embodiment of the invention. In step 302, if a reset signal is detected, the method branches to step 314; otherwise, the method proceeds to step 305.

In step 305, if an initialization signal is detected, the method proceeds to step 314; otherwise, the method branches to step 335. Steps 302 and 305 therefore prompt an initialization process if either a reset signal or an initialization signal is received (i.e., if a reload signal occurs).

In step 314, the mode value 219 is obtained. The mode value 219 selects an initialization value set from among a plurality of initialization value sets, as previously discussed.

In step 317, two or more memory elements 202 are substantially simultaneously initialized. This may include the initialization of a desired number of memory elements. For example, a predetermined number of registers may be initialized. Each mode of the electronic device may include a different set of initialization values, and each mode may initialize a different grouping of memory elements. For example, in a first mode the memory elements having addresses 0000h (hexadecimal) to 4FFFh may be initialized, while in a second mode the memory elements having addresses 0000h to 7555h may be initialized. Each memory element may be initialized to a unique value. Alternatively, some memory elements may be initialized with a common value, such as initialization to a zero default value (i.e., memory elements in the 0000h–4FFFh range receive values, while memory elements in the 5000h–FFFFh range being initialized with all zeros or other benign values).

The initialization may occur during a reset, such as at power-up, or when a reset is initiated by a user, for example. Alternatively, the initialization may be independent of a reset. The initialization may be commenced by the processing system 212 upon a mode change or other input received through the user interface 217, at a predetermined time period, if corrupted memory values are detected, etc.

In step 335, normal operation of the electronic device 200 resumes. However, the reset and initialization tests of steps 302 and 305 may be periodically performed by the electronic device 200.

Figure 4:
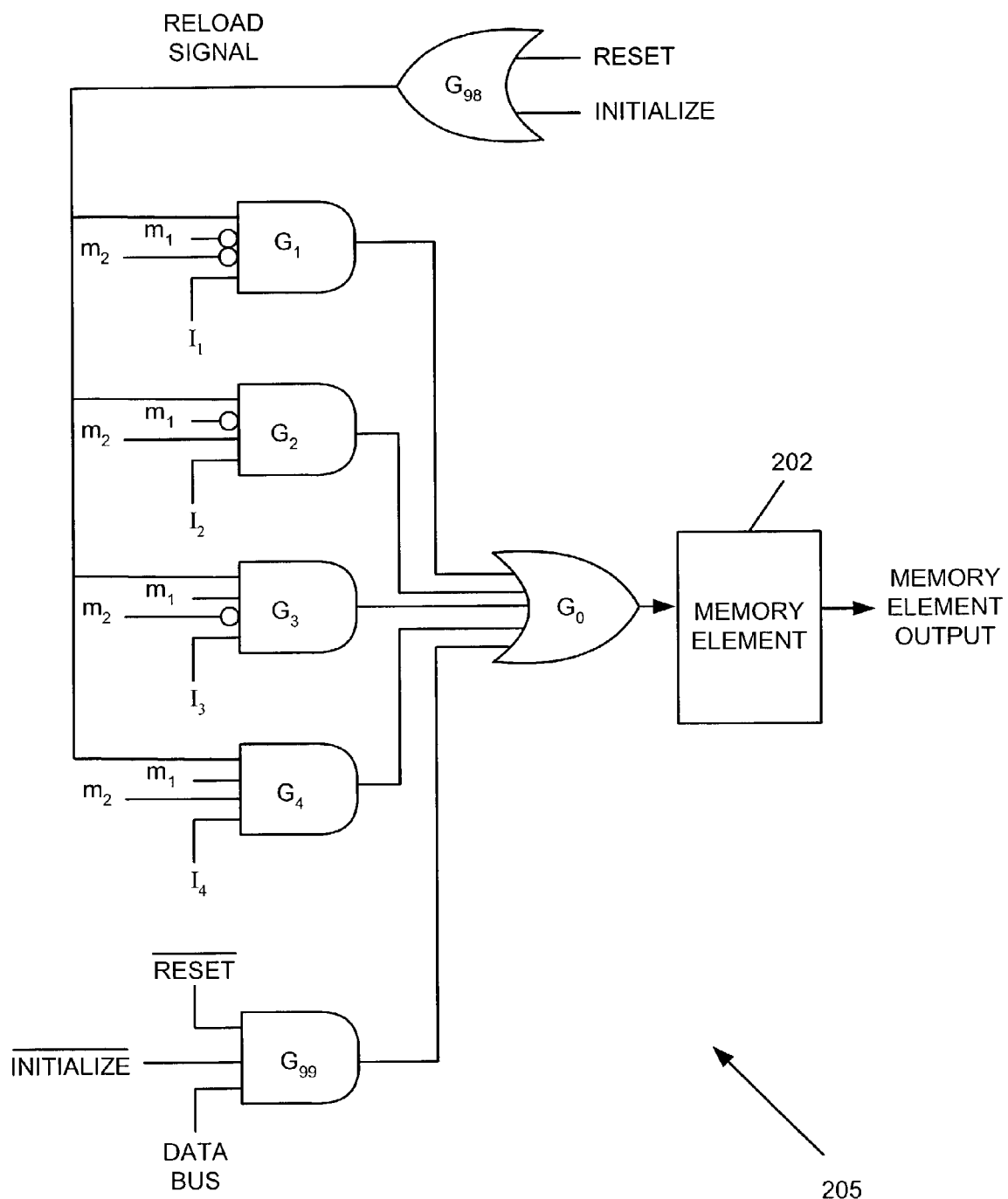
FIG. 4 is a diagram of an initialization logic circuit according to yet another embodiment of the invention.

FIG. 4 is a diagram of an initialization logic circuit 205 according to yet another embodiment of the invention. The initialization logic circuit 205 includes the memory element 202, a plurality of initialization logic circuits, such as a plurality of initialization AND gates $G_1$–$G_4$ (could be any number of initialization logic circuits, depending on the size of the mode value 219), an OR logic circuit, such as the OR gate $G_0$, and a non-initialization logic circuit, such as a non-initialization AND gate $G_{99}$. The plurality of initialization AND gates $G_1$–$G_4$ and the non-initialization AND gate $G_{99}$ are inputs to the OR gate $G_0$, which passes a memory element input from one of the gates $G_1$–$G_4$ or $G_{99}$.

In addition, the initialization logic circuit 205 may include a reload signal OR gate $G_{98}$ that passes either a reset signal or an initialization signal to the initialization AND gates $G_1$–$G_4$. It should be understood that the reload signal OR gate $G_{98}$ is not required, but is shown for clarity. The reload signal OR gate $G_{98}$ may be implemented in software, and the reload signal therefore may be a single output of the processing system 212.

In operation, if a reload signal is present, then the non-initialization AND gate $G_{99}$ does not pass any data. In this example, the mode value 219 is a 2-bit value, and may be one of the binary values 00, 01, 10, or 11. Consequently, four initialization AND gates $G_1$–$G_4$ are required. If only two modes were used, only two initialization AND gates $G_1$–$G_2$ would be needed. If the mode value 219 is a binary 00 value, then the initialization AND gate $G_1$ gates the initialization value $I_1$ to the OR gate $G_0$, which passes the initialization value $I_1$ to the memory element 202. If the mode value 219 is instead a binary 01 value, then the initialization AND gate $G_2$ gates the initialization value $I_2$, and so on.

Conversely, if a reload signal is not present, then the initialization AND gates $G_1$–$G_4$ are inactive and the non-initialization AND gate $G_{99}$ gates a value from the data bus to the OR gate $G_0$ and then to the memory element 202. This is a normal memory write operation. It should be noted that the inverted reset and inverted initialize inputs of the non-initialization AND gate $G_{99}$ could be replaced by an inverted reload signal, as is known in the art.

It should be understood that the logic gates shown and discussed above, and in the figures and discussion below, may be replaced by an equivalent logic circuit that performs the described gating functions. The figures and descriptions include AND logic gates and OR logic gates in order to fully describe the function of the corresponding logic circuits. It should be further understood that the number of logic gates and their arrangement may be varied as necessary, and the example circuits given in the figures are provided for illustration.

Figure 5:
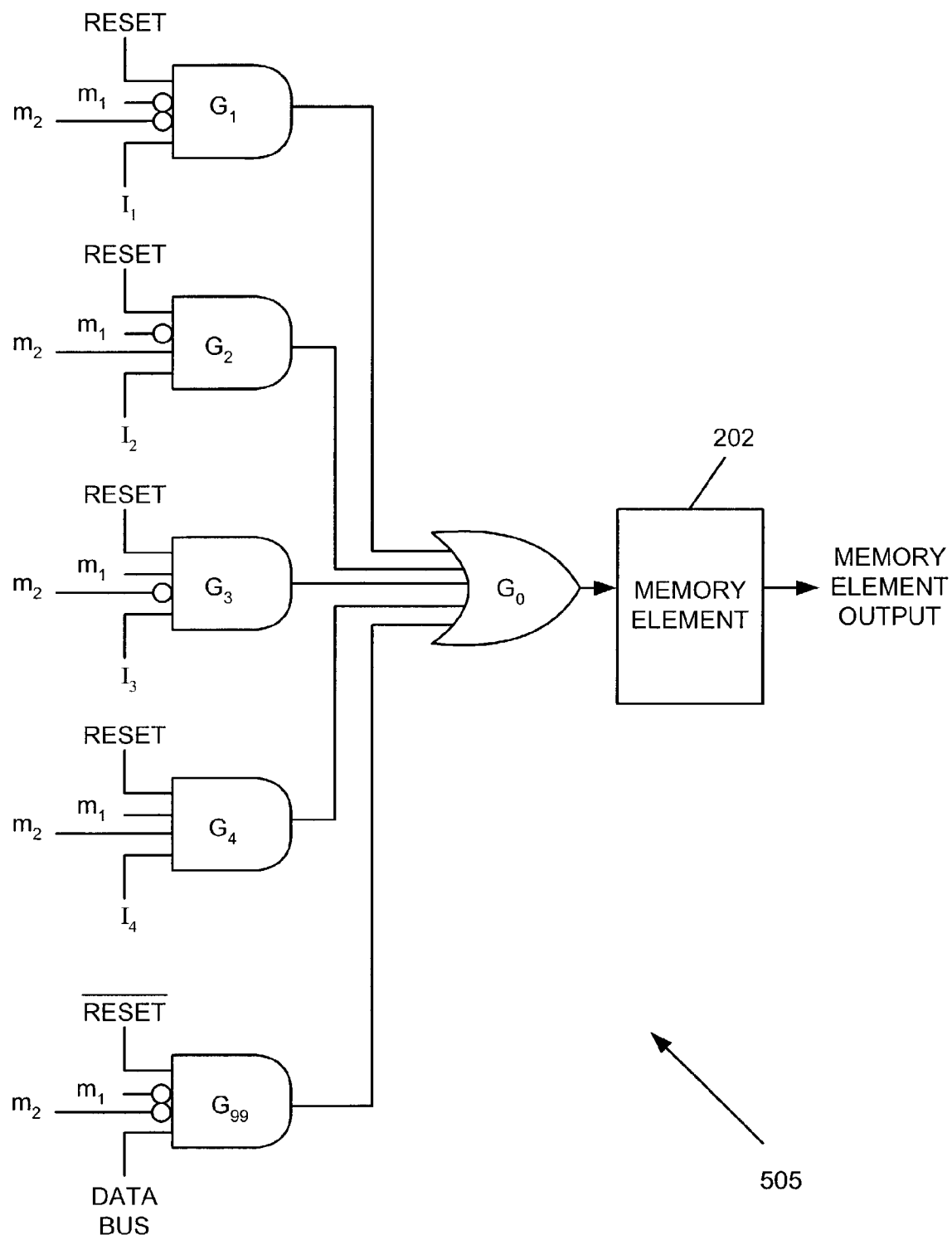
FIG. 5 is a diagram of a memory element write logic circuit according to yet another embodiment of the invention.

FIG. 5 is a diagram of a memory element write logic circuit 505 according to yet another embodiment of the invention. In the memory element write logic circuit 505, writes to the memory element 202 may be blocked in certain modes. Here, a write-blocking (i.e., a non-initialization) logic circuit, such as a write-blocking AND gate $G_{99}$, includes an output communicating with the memory element 202, a data bus input, an inverted reset input, and one or more mode value inputs (shown again as two inputs $m_1$ and $m_2$, but could be any number, as before). Therefore, when the electronic device 200 is not in a reset, the mode inputs $m_1$ and $m_2$ determine whether the data bus can write values to the memory element 202. The memory element write logic circuit 505 passes a data bus value from the data bus input to the output (i.e., allows a write to the memory element 202) when not in a reset and if an appropriate mode value is placed on the one or more mode value inputs. In the example shown, writes to the memory element 202 are only allowed if the mode value 219 is a binary 00 value.

It should be understood that the write-blocking AND gate $G_{99}$ could be implemented as a plurality of gates that allow or block writes according to the mode value 219. For example if there are 4 modes in the electronic device 200, there could be four gates (similar to the gates $G_1$–$G_4$) to allow or block writes as desired. It should be noted that the write blocking of the invention may be combined with the initialization of the invention, as shown in this figure. Consequently, the AND gate $G_{99}$ may perform write-blocking during non-initialization operations.

Figure 6:
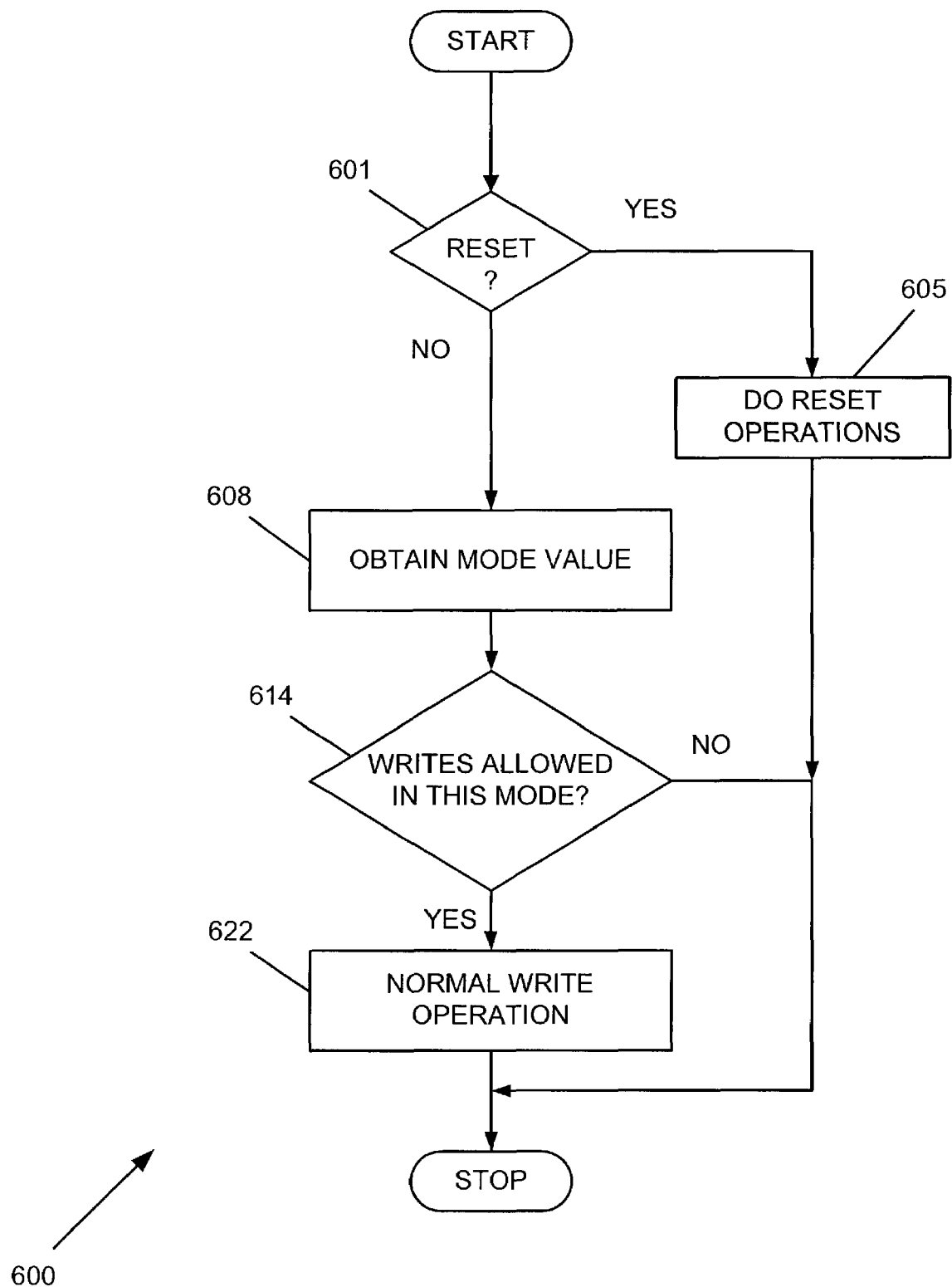
FIG. 6 is a flowchart of a memory element write-blocking method according to yet another embodiment of the invention.

FIG. 6 is a flowchart 600 of a write-blocking method according to another embodiment of the invention. The flowchart 600 corresponds to the memory element write logic circuit 505 of FIG. 5. In this embodiment, write operations for selected memory elements may be blocked during normal operation (i.e., after conclusion of a reset operation) if the mode value 219 does not allow a normal operation write to that particular memory element. In step 601, if a reset signal is detected, the method branches to step 605, where reset operations are performed; otherwise, the method proceeds to step 608. As a result, if a reset is occurring, then reset operations are performed.

In step 608, the mode value 219 is obtained. It should be understood that steps 608–622 represent normal, non-reset operations of the electronic device 200.

In step 614, the mode value 219 is checked to see if a write to the corresponding memory element is allowed in the current mode. If the memory write is not allowed, the method exits; otherwise, it proceeds to step 622. It should be understood that only the memory elements that include the memory element write logic circuit 505 of FIG. 5, or its equivalent, will be capable of blocking a memory write operation.

In step 622, a write operation to the appropriate memory element 202 is performed. In this manner, some memory elements may be write disabled in specific modes. Therefore, in a particular mode, all unused memory elements/registers may be write disabled. For example, in a mode 1, the electronic device 200 writes to memory element 1FFFh but cannot write to memory element 1FFFh in modes 2–5. This aspect of the invention enables unused memory elements of a mode to be blocked, i.e., a reset mode may initialize only the used memory elements and block writes to all unused memory elements. For example, in a particular mode the memory elements 0000h to 5555h may be initialized upon a reset while the memory elements 5556h–FFFFh are blocked for all writes.

Figure 7:
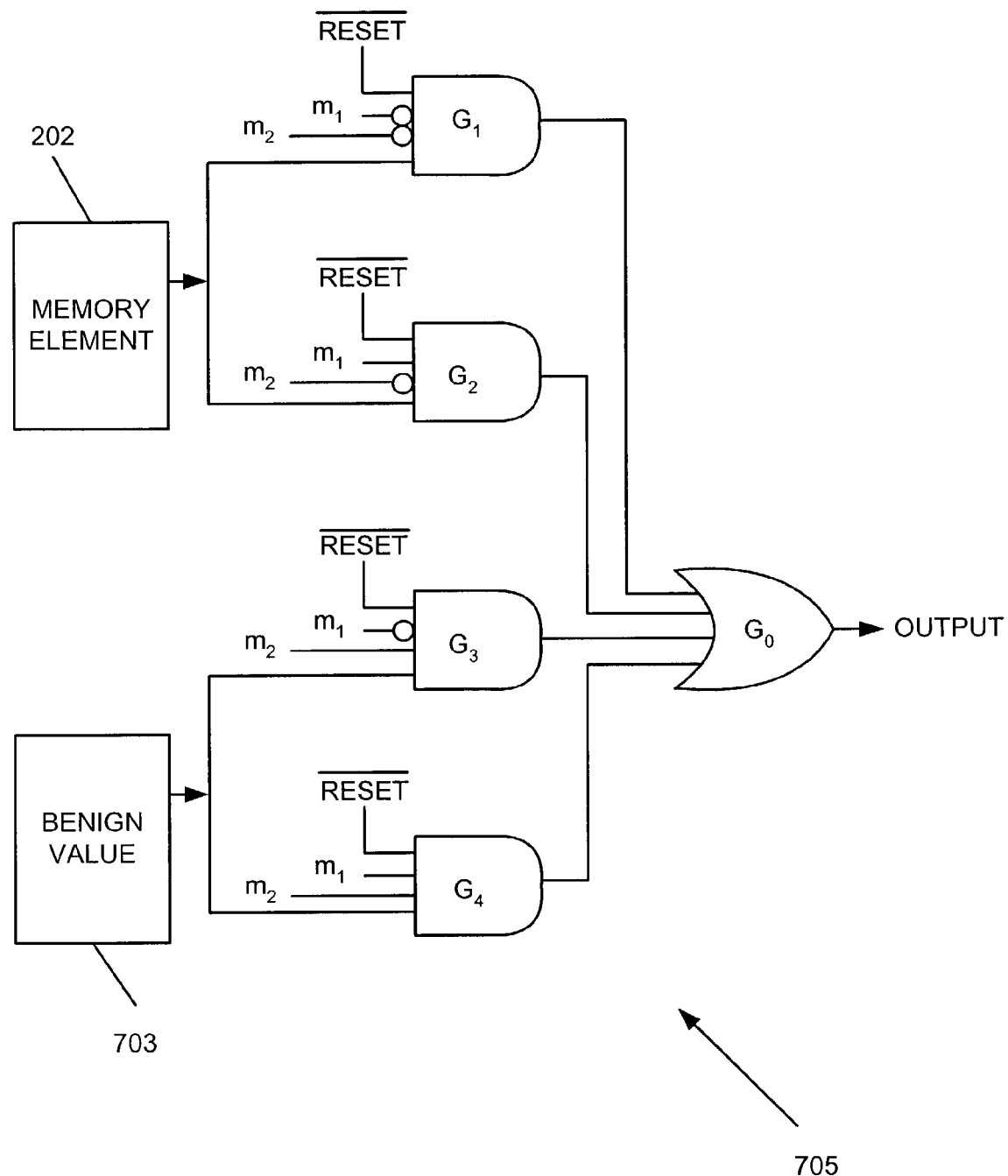
FIG. 7 is a diagram of an memory element read logic circuit according to yet another embodiment of the invention.

FIG. 7 is a diagram of a memory element read logic circuit 705 according to yet another embodiment of the invention. The memory element read logic circuit 705 is capable of blocking non-reset memory read operations, according to the mode value 219. The memory element read logic circuit 705 receives the output of the memory element 202. The memory element read logic circuit 705 selects the memory element as a read output of the read operation when the electronic device 200 is not in a reset and if the mode value 219 allows the read operation. Otherwise, the memory element read logic circuit 705 outputs a benign value.

The memory element read logic circuit 705 includes a benign value 703, one or more read-allowing logic circuits, such as the read-allowing AND gates $G_1$ and $G_2$, one or more read-blocking logic circuits, such as the read-blocking AND gates $G_3$ and $G_4$, and an OR gate $G_0$.

The one or more read-allowing logic circuits include an output, an inverted reset input, one or more mode value inputs, and a memory element input connected to the memory element. The one or more read-allowing logic circuits pass a memory element value to the output if an appropriate mode value is placed on the one or more mode value inputs.

The one or more read-blocking logic circuits include an output, an inverted reset input, one or more mode value inputs, and a benign value input connected to the benign value 703. The one or more read-blocking logic circuits pass the benign value 703 to the output if an appropriate mode value is placed on the one or more mode value inputs.

The benign value 703 may be a hardwired digital value or may be a digital value stored in a corresponding benign value memory element (such as a ROM memory element, for example). It may be possible to store one benign value that is used for read-blocking a plurality of memory elements.

The benign value 703 may be any value that may be substituted for the actual contents of the memory element 202. This aspect of the invention enables unused memory elements/registers of a mode to provide a benign value regardless of the actual contents of the memory element, i.e., the mode value 219 may dictate that all unused memory elements provide a read output of 00h, even though they don't actually store all zeroes. This may be more economical and faster than clearing the memory elements, and could provide a more robust operation of the electronic device 200. For example, in a particular mode, the registers 0000h–5555h could be initialized upon a reset, while the registers 5556h–FFFFh are not initialized but instead could provide benign output values if a read operation is performed.

In the example shown in the figure, the output of the memory element 202 is provided as an input to the read-allowing AND gates $G_1$ and $G_2$ while the benign value 703 is provided as an input to the read-blocking AND gates $G_3$ and $G_4$. In this example, if the electronic device 200 is not in a reset and the mode is a binary 00 or 10 value, then the output of the memory element 202 is gated to the OR gate $G_0$ via the read-allowing AND gates $G_1$ and $G_2$ respectively, and the output of the memory element 202 becomes the read output. However, if the electronic device 200 is not in a reset and the mode is a binary 01 or 11 value, then the benign value 703 is gated to the OR gate $G_0$ via the read-blocking AND gates $G_3$ and $G_4$ respectively, and the benign value 703 becomes the read output of the memory element 202.

Figure 8:
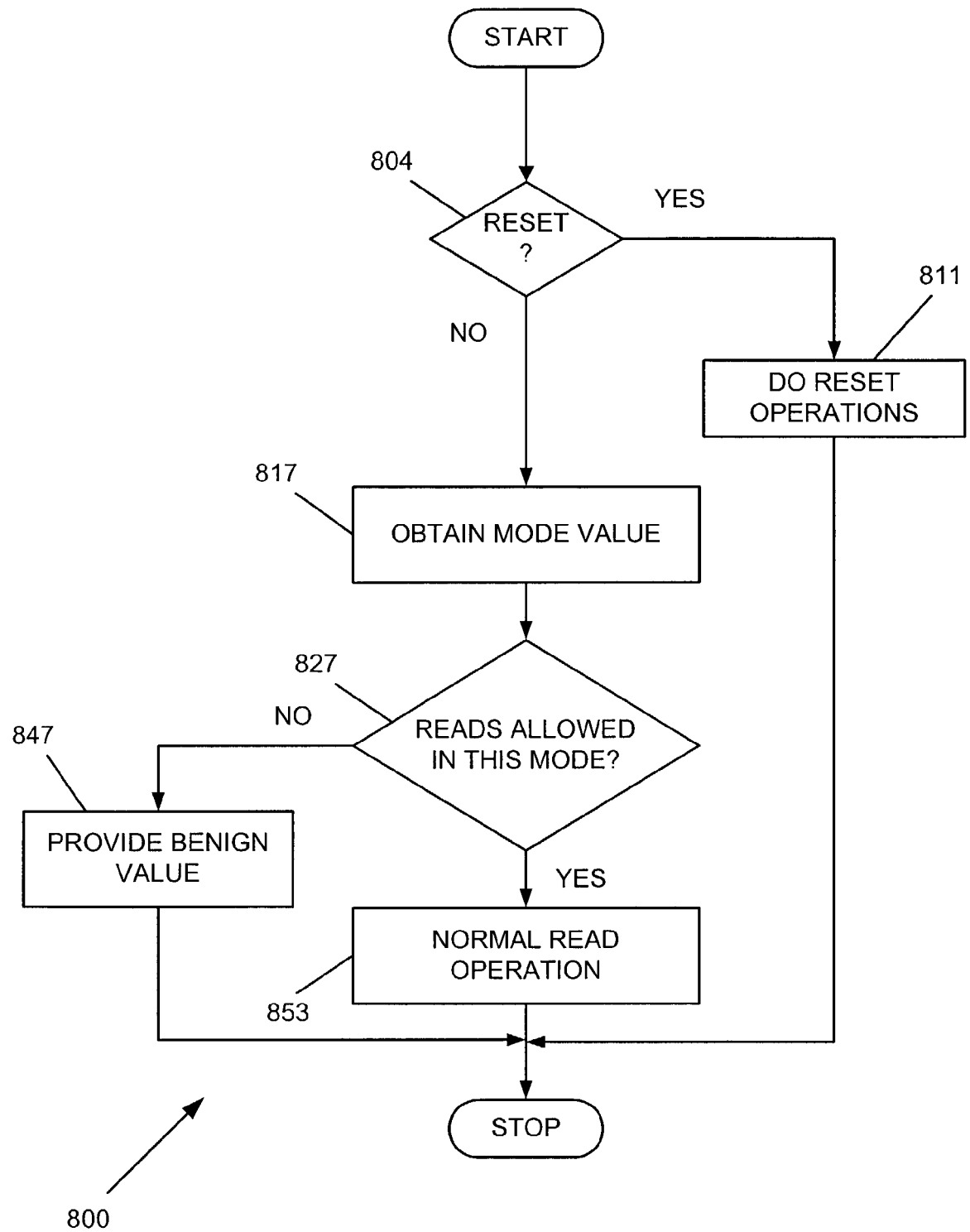
FIG. 8 is a flowchart of a memory element read-blocking method according to yet another embodiment of the invention.

FIG. 8 is a flowchart 800 of a memory element read-blocking method according to yet another embodiment of the invention. The flowchart 800 corresponds to the memory element read logic circuit 705 of FIG. 7. In this embodiment, normal read operations for selected memory elements may be blocked during normal operation, and a benign value may be provided in substitution. In step 804, if a reset signal is detected, the method branches to step 811, where reset operations are performed; otherwise, the method proceeds to step 817.

In step 817, the mode value 219 is obtained.

In step 827, the mode value 219 is checked to see if a read of the corresponding memory element is allowed in the current mode. If the memory element read is not allowed, the method branches to step 847; otherwise, it proceeds to step 853. It should be understood that only the memory elements that include the memory element read logic circuit 705 of FIG. 7, or its equivalent, will be capable of blocking a memory read operation.

In step 847, where the memory read operation is blocked, the benign value 703 is provided as the result of the memory read operation. The benign value is not actually stored within the memory element 202. The benign value 703 may be wired or programmed into the electronic device 200, or may be selected and configured during manufacture of the electronic device 200.

In step 853, wherein the memory read operation is not blocked, a normal memory read operation is performed. The output is the actual contents of the memory element 202.

The memory operations according to the various embodiments of the invention may be applied to any type of memory. The memory may be employed in any electronic device that uses digital memory, and is especially suited for electronic devices that need to be initialized in one of a plurality of modes. In addition, the invention allows initialization of a bit or a plurality of bits. The invention is especially suited for the initialization, reading, and writing of registers.

The invention differs from the prior art in that the prior art is not capable of simultaneously initializing a plurality of memory elements. Furthermore, the prior art is not capable of selecting an initialization value set from among a plurality of initialization value sets and initializing a memory element with the selected initialization value set. Moreover, the prior art is not capable of blocking memory read and/or write operations to a memory element based on a mode of the electronic device.

The invention provides several benefits. The simultaneous initialization according to the invention is much faster than the prior art serial approach wherein initialization values are read out of memory, transported over a bus, and serially programmed into destination registers. In addition, there is no need to program an initialization process and initialization values into a control software. Moreover, the electronic device 200 can be initialized in one of a plurality of modes, and each initialization value set can implement a unique mode in the electronic device 200. This eliminates the need for multiple register sets for multiple modes, and therefore reduces cost, ensures proper operation, and frees up memory space.

What is claimed is:

1. An electronic device, comprising:
    a memory comprising at least a first memory element and a second memory element;
    a first plurality of initialization value sets available to be loaded into said first memory element;
    a second plurality of initialization value sets available to be loaded into said second memory element;
    a mode value that indicates a mode from among a plurality of modes of said electronic device; and
    a first initialization logic circuit and a second initialization logic circuit corresponding to said first memory element and said second memory element, said first and second initialization logic circuits receiving said mode value and adapted to receive a reload signal;
    wherein upon occurrence of said reload signal, said first initialization logic circuit selects a first predetermined initialization value set from among said first plurality of initialization value sets according to said mode value and initializes said first memory element with said first predetermined initialization value set and substantially simultaneously said second initialization logic circuit selects a second predetermined initialization value set from among said second plurality of initialization value sets according to said mode value and initializes said second memory element with said second predetermined initialization value set.

2. The electronic device of claim 1, wherein said reload signal comprises a reset signal.

3. The electronic device of claim 1, wherein said reload signal comprises an initialization signal.

4. The electronic device of claim 1, wherein an initialization value set comprises one or more hardwired digital values.

5. The electronic device of claim 1, wherein an initialization value set comprises one or more digital values stored in an initialization value memory element.

6. The electronic device of claim 1, further comprising a processing system connected to said first and second initialization logic circuits by a reload signal line and generating said reload signal on said reload signal line, wherein said reload signal is software-generated within said processing system.

7. The electronic device of claim 1, further comprising a processing system connected to said first and second initialization logic circuits by a reload signal line and generating said reload signal on said reload signal line and a user interface connected to said processing system, wherein said reload signal is generated by said processing system in response to a user input received from said user interface.

8. The electronic device of claim 1, wherein said mode value comprises a hardwired digital value.

9. The electronic device of claim 1, wherein said mode value comprises a digital value stored in a mode value memory element.

10. The electronic device of claim 1, wherein said mode value is user-settable.

11. The electronic device of claim 1, with an initialization logic circuit comprising:
    a plurality of initialization logic circuits that select said predetermined initialization value set according to said mode value, with said predetermined initialization value set being passed to a corresponding memory element upon occurrence of said reload signal;
    a non-initialization logic circuit that passes a data bus value to said corresponding memory element in the absence of said reload signal; and
    an OR logic circuit that passes either said predetermined initialization value set or said data bus value to said corresponding memory element.

12. A memory initialization method for an electronic device, comprising the steps of:
    obtaining a mode value upon receipt of a reload signal;
    selecting a first predetermined initialization value set from among a first plurality of initialization value sets available to be loaded into a first memory element according to said mode value;
    initializing said first memory element with said first predetermined initialization value set;
    selecting a second predetermined initialization value set from among a second plurality of initialization value sets available to be loaded into a second memory element; and
    initializing said second memory element with said second predetermined initialization value set;
    wherein the initialization of said first memory element and said second memory element occur substantially simultaneously.

13. The method of claim 12, wherein said reload signal comprises a reset signal.

14. The method of claim 12, wherein said reload signal comprises an initialization signal.

15. The method of claim 12, wherein an initialization value set comprises one or more hardwired digital values.

16. The method of claim 12, wherein an initialization value set comprises one or more digital values stored in an initialization value memory element.

17. The method of claim 12, further comprising the step of modifying said mode value in response to a user input.

* * * * *